(12) United States Patent
Liu et al.

(10) Patent No.: US 12,229,487 B2
(45) Date of Patent: Feb. 18, 2025

(54) HOTSPOT AVOIDANCE METHOD OF MANUFACTURING INTEGRATED CIRCUITS

(71) Applicant: Taiwan Semiconductor Manufacturing Co., Ltd., Hsinchu (TW)

(72) Inventors: I-Shuo Liu, Hsinchu (TW); Chih-Chun Hsia, Hsinchu (TW); Hsin-Ting Chou, Hsinchu (TW); Kuanhua Su, Hsinchu (TW); William Weilun Hong, Hsinchu (TW); Chih Hung Chen, Hsinchu (TW); Kei-Wei Chen, Tainan (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 18/308,916

(22) Filed: Apr. 28, 2023

(65) Prior Publication Data
US 2023/0267264 A1 Aug. 24, 2023

Related U.S. Application Data

(63) Continuation of application No. 17/814,991, filed on Jul. 26, 2022, now Pat. No. 11,675,953, which is a
(Continued)

(51) Int. Cl.
*G06F 30/392* (2020.01)
*G06F 111/20* (2020.01)
*G06T 7/00* (2017.01)

(52) U.S. Cl.
CPC ........... *G06F 30/392* (2020.01); *G06T 7/001* (2013.01); *G06F 2111/20* (2020.01); *G06T 2207/20021* (2013.01); *G06T 2207/30148* (2013.01)

(58) Field of Classification Search
CPC .............................. G06F 30/392; G06T 7/001
(Continued)

(56) References Cited

U.S. PATENT DOCUMENTS 8,434,030 B1 * 4/2013 Hou ..................... G06F 30/398
716/54
8,580,635 B2 11/2013 Chan et al.
(Continued)

FOREIGN PATENT DOCUMENTS

CN 109390466 A 2/2019
DE 102012217336 A1 6/2013
(Continued)

*Primary Examiner* — Jack Chiang
*Assistant Examiner* — Suchin Parihar
(74) *Attorney, Agent, or Firm* — Slater Matsil, LLP

(57) ABSTRACT

A method includes cropping a plurality of images from a layout of an integrated circuit, generating a first plurality of hash values, each from one of the plurality of images, loading a second plurality of hash values stored in a hotspot library, and comparing each of the first plurality of hash values with each of the second plurality of hash values. The step of comparing includes calculating a similarity value between the each of the first plurality of hash values and the each of the second plurality of hash values. The method further includes comparing the similarity value with a predetermined threshold similarity value, and in response to a result that the similarity value is greater than the predetermined threshold similarity value, recording a position of a corresponding image that has the result. The position is the position of the corresponding image in the layout.

20 Claims, 16 Drawing Sheets

Related U.S. Application Data continuation of application No. 16/926,026, filed on Jul. 10, 2020, now Pat. No. 11,443,095.

(58) Field of Classification Search
USPC ........................................................ 716/139
See application file for complete search history.

(56) References Cited

U.S. PATENT DOCUMENTS

| | | | |
|---|---|---|---|
| 10,074,036 | B2 | 9/2018 | Liu et al. |
| 10,997,340 | B2 | 5/2021 | Hu et al. |
| 11,443,083 | B2 | 9/2022 | Su et al. |
| 11,871,686 | B2 | 1/2024 | Tseng et al. |
| 2003/0054573 | A1 | 3/2003 | Tanaka |
| 2006/0258267 | A1* | 11/2006 | Ito ..................... C09K 3/1454 |
| | | | 257/E21.244 |
| 2006/0273266 | A1* | 12/2006 | Preil .................. G03F 7/70666 |
| | | | 430/311 |
| 2007/0156379 | A1 | 7/2007 | Kulkarni |
| 2007/0230770 | A1 | 10/2007 | Kulkarni |
| 2007/0266362 | A1* | 11/2007 | Lai ...................... G06F 30/398 |
| | | | 716/54 |
| 2007/0288219 | A1 | 12/2007 | Zafar |
| 2010/0131908 | A1* | 5/2010 | Krishnan ................ G06F 30/30 |
| | | | 716/136 |
| 2010/0211202 | A1* | 8/2010 | Chou ............... G05B 19/41875 |
| | | | 702/83 |
| 2011/0197173 | A1* | 8/2011 | Fukuda ................... H01L 22/12 |
| | | | 716/111 |
| 2012/0229618 | A1 | 9/2012 | Urano |
| 2014/0113528 | A1* | 4/2014 | Cormont ................. B24B 51/00 |
| | | | 451/6 |
| 2014/0376801 | A1* | 12/2014 | Karsenti ................. G06T 7/001 |
| | | | 382/145 |
| 2015/0069232 | A1 | 3/2015 | Lin et al. |
| 2016/0282856 | A1* | 9/2016 | Wachs ............. G05B 19/41875 |
| 2016/0300338 | A1* | 10/2016 | Zafar ..................... G06F 18/22 |
| 2019/0147127 | A1 | 5/2019 | Su et al. |
| 2019/0188840 | A1 | 6/2019 | Kwon |
| 2019/0318471 | A1 | 10/2019 | Chen et al. |
| 2019/0333205 | A1* | 10/2019 | Fang .................... G05B 19/406 |
| 2021/0126109 | A1 | 4/2021 | Lin |

FOREIGN PATENT DOCUMENTS

| | | |
|---|---|---|
| KR | 20170071590 A | 6/2017 |
| KR | 20190006188 A | 1/2019 |
| TW | 201842457 A | 12/2018 |
| TW | I694343 B | 5/2020 |
| WO | 2019129569 A1 | 7/2019 |

\* cited by examiner

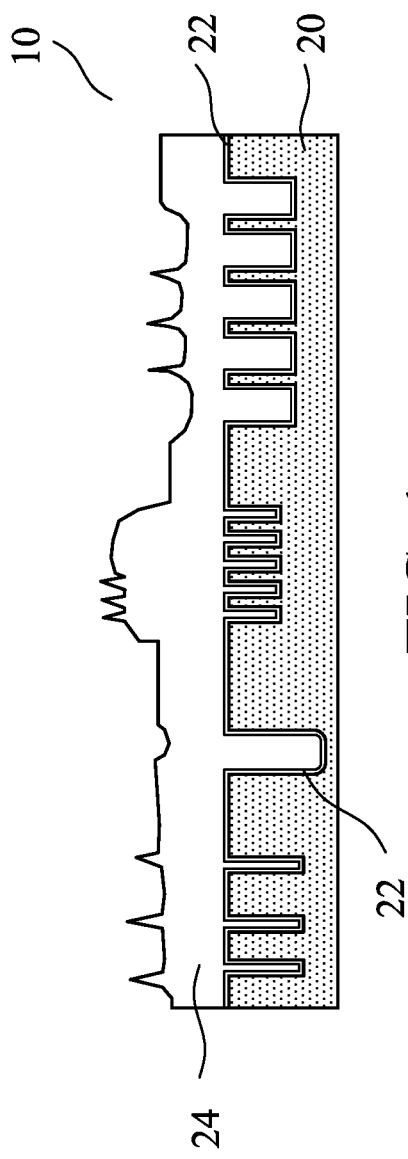
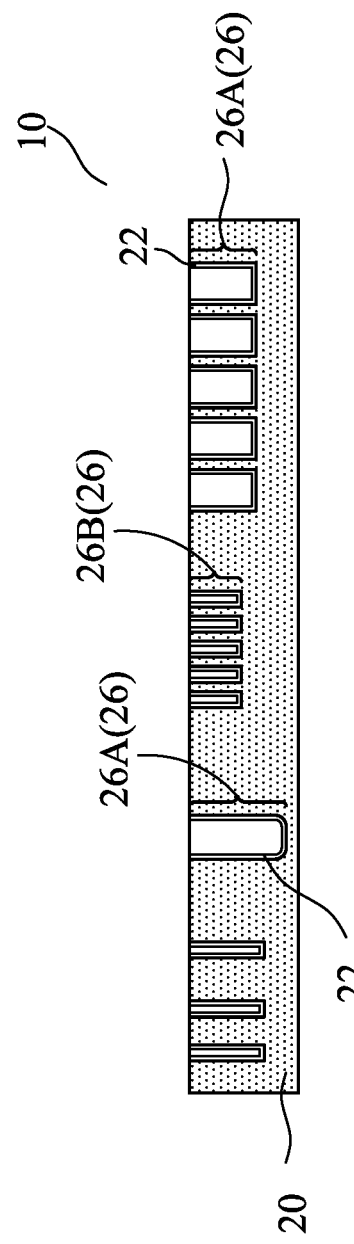

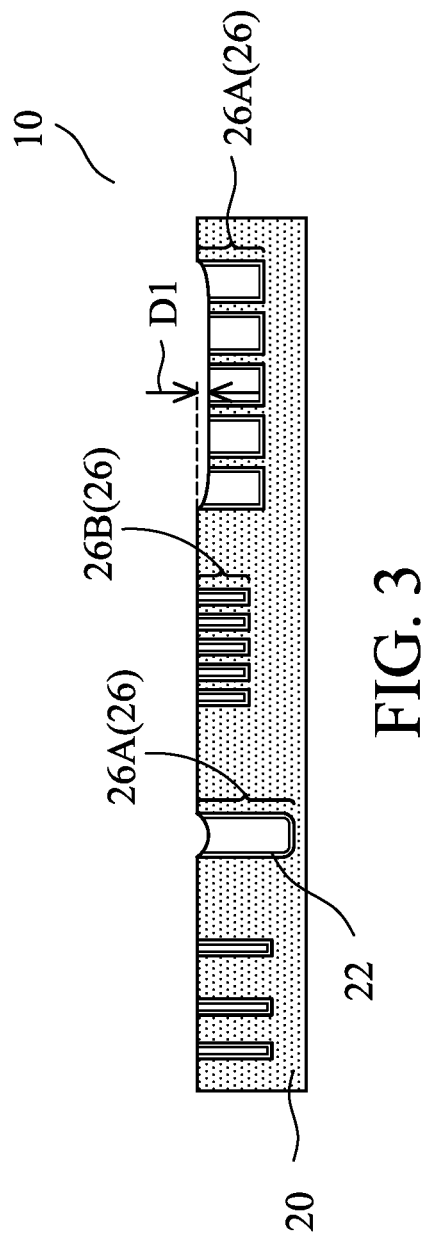
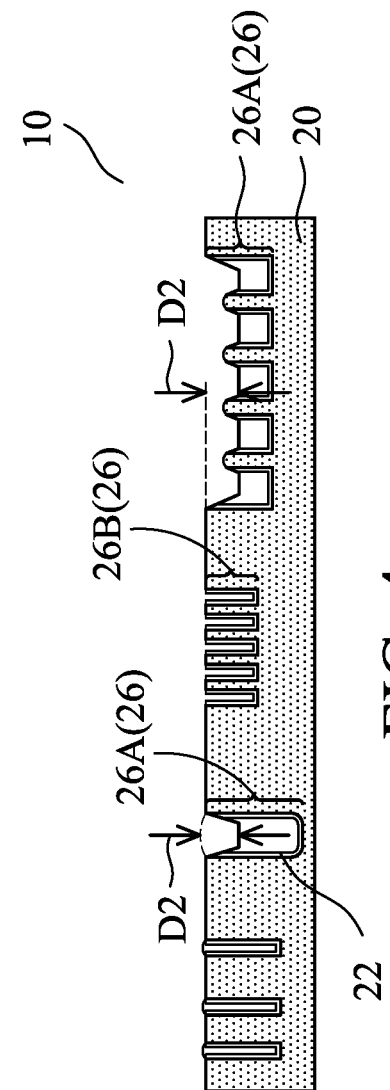

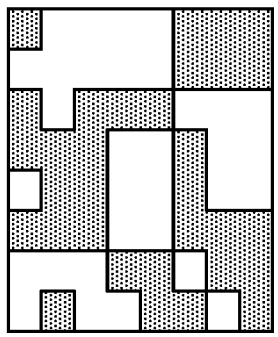 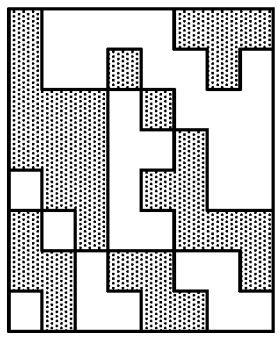 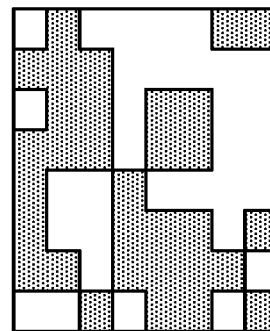
Image A — Hash value:4be2c3dddc223939
Image B — Hash value:09c4c3bdd4623b79
Image C — Hash value:a10d8ef1cbc67d7a
FIG. 7

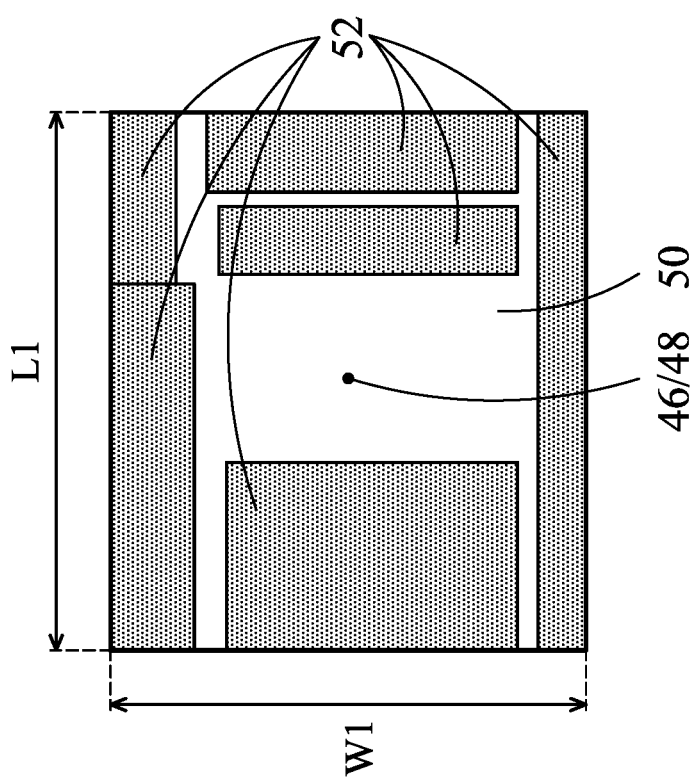
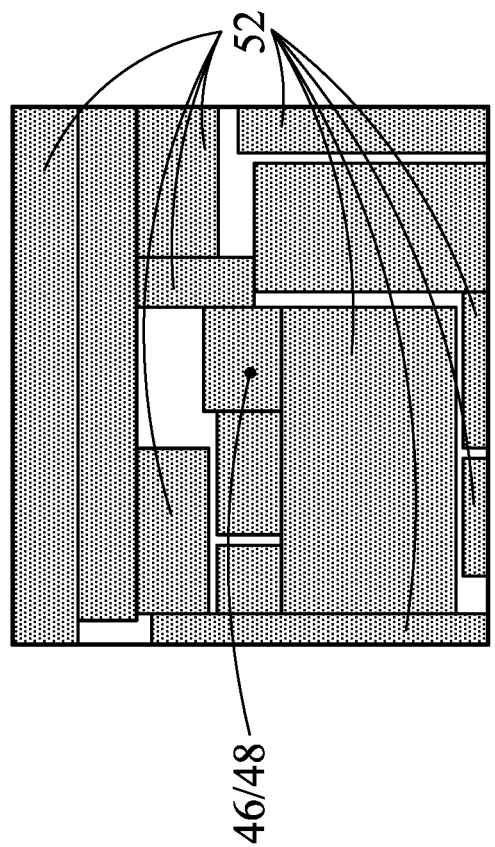
FIG. 11
FIG. 12

HOTSPOT AVOIDANCE METHOD OF MANUFACTURING INTEGRATED CIRCUITS

PRIORITY CLAIM AND CROSS-REFERENCE

This application is a continuation of U.S. patent application Ser. No. 17/814,991, entitled "Hotspot Avoidance Method for Manufacturing Integrated Circuits," filed on Jul. 26, 2022, which is a continuation of U.S. patent application Ser. No. 16/926,026, entitled "Hotspot Avoidance Method for Manufacturing Integrated Circuits," filed on Jul. 10, 2020, now U.S. Pat. No. 11,443,095, issued Sep. 13, 2022, which applications are incorporated herein by reference.

BACKGROUND

In the manufacturing of integrated circuits, process-related defects such as topology hotspots are found after the respective process is completed by physically measuring from the manufactured wafers. For example, to find the defects related to the Chemical Mechanical Polish (CMP), several phases including circuit design phase, circuit layout phase, manufacturing and performing CMP on the physical wafers, and measuring the physical wafers have to be performed to find topology defects. This process typically takes three months.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 1 through 4 illustrate the cross-sectional views of structures with chemical mechanical polish process performed thereon and the results in accordance with some embodiments.

FIG. 7 illustrates example images and the generated hash values in accordance with some embodiments.

FIGS. 11 and 12 illustrate the represented regions in a cropped image with different pattern densities and line widths in accordance with some embodiments.

DETAILED DESCRIPTION

Figure 5:
FIG. 5 illustrates a schematic flow in the design and manufacturing of an integrated circuit in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "underlying," "below," "lower," "overlying," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A hotspot avoidance method for manufacturing integrated circuits is provided in accordance with some embodiments. The system and the processes for predicting the hotspots and using the predicted hotspots to find an optimum recipe are illustrated in accordance with some embodiments. Some variations of some embodiments are discussed. Embodiments discussed herein are to provide examples to enable making or using the subject matter of this disclosure, and a person having ordinary skill in the art will readily understand modifications that can be made while remaining within contemplated scopes of different embodiments. Throughout the various views and illustrative embodiments, like reference numbers are used to designate like elements.

Although method embodiments may be discussed as being performed in a particular order, other method embodiments may be performed in any logical order.

Throughout the description, the term "hotspot" refers to the defects generated in the integrated circuit manufacturing processes rather than the defects related to the design. Alternatively stated, the term "hotspot" refers to the process-related defects. An example of the hotspots is the defects generated in the Chemical Mechanical Polish (CMP) processes, as will be discussed in detail referring to FIGS. 1 through 4, while the hotspots may also refer to other types of defects including, and not limited to, the defects relating to etching processes (for example, the parts that are intended to be removed but failed to be removed in etching), the defects related to deposition process, etc.

FIGS. 1 through 4 illustrate the deposition of some features, the CMP process, and several possible results as a result of the CMP. It is appreciated that FIGS. 1 through 4 illustrate the example structure of a CMP process for the formation of metal lines, while an actual CMP process may be applied on different structures, different material, and the like. Referring to FIG. 1, wafer 10 is provided. Wafer 10 includes base layer 20, which may include, for example, a silicon substrate and the overlying structures and layers, and the details are not illustrated. A plurality of trenches may be formed extending into a dielectric layer of the base layer 20. Deposition processes are then made to deposit glue layer 22, and a metallic material 24 over glue layer 22. In accordance with some embodiments of the present disclosure, glue layer 22 may be formed of or comprise titanium, titanium nitride, tantalum, tantalum nitride, or the like. The filling material 24 may include copper, aluminum copper, or the like. Due to the topology of the trenches in base layer 20, the deposited metallic material 24 has non-planar top surfaces that may reflect the topology of the base layer 20. A CMP process is performed to remove excess portions of metallic material 24, resulting in a plurality of conductive features 26 (including 26A and 26B), which may include metal lines, vias, contact plugs, or the like, as shown in FIG. 2, 3, or 4.

Due to various factors such as the topology of base structure 20, for example, the density and the widths of the trenches, and the recipe of the CMP process, different results may be achieved, as shown in FIGS. 2, 3, and 4. Throughout the description, the term "recipe" refers to the collection of the process conditions such as the number of (sub) steps in the CMP process, the types of slurry, the flow rates of the slurry, the down force of the wafer against the polishing pad, the dressing, the rotation speed, etc. A recipe thus includes a fixed collection of process conditions. When one or more of the process conditions of a recipe is changed, it is considered as that another recipe is generated. FIG. 2 illustrates an ideal case to be achieved. In FIG. 2, the top surfaces of all resulting conductive features 26 (including 26A and 26B) are coplanar, regardless of the widths and the pattern densities of conductive features 26.

FIG. 3 illustrates an actual case, which is non-ideal but is still acceptable. Due to the pattern-loading effect, the portions of metallic material 24 with higher density and/or larger widths are polished more than the portions of metallic material 24 with lower density and/or smaller widths, resulting in dishing effect, with recesses generated. The depths D1 of the recesses are smaller than design specification, and hence no hotspot is generated. For example, the design specification may require the dishing depth to be smaller than about 10 nm. Since depths D1 of all recesses are smaller than the specification, the result is acceptable, and the recesses are not hotspots.

FIG. 4 illustrates a case in which hotspots are generated where trenches are wide and/or the pattern densities of trenches are high. For example, the recessing depths D2 of the wide trenches are greater than the design specification (10 nm, for example). These out-of-specification recesses may cause problems for subsequent processes, which problems may include circuit shorting, circuit breaking, or the like, depending on the specific circuit design. Throughout the description, the out-of-specification recesses are used as the example hotspots to explain the concept of the present disclosure. Also, it is appreciated that FIGS. 3 and 4 illustrate the over-polishing in the CMP process, while under-polishing, in which some portions are polished less (and thus higher than the top surfaces of base layer 20) may also occur, and hotspots may also be generated when the resulting humps are out-of-specification. The hotspots may result in the loss of production yield, and need to be eliminated or at least reduced to be within specification.

FIG. 5 illustrates a schematic flow in the design and manufacturing of an integrated circuit in accordance with some embodiments of the present disclosure. A circuit design is first provided (process 30), and the design may include the schematic of the circuit. Next, the layout of the circuit is prepared (process 32). From the layout, the hotspots and their positions in the layout are predicted (process 34) using a model provided in accordance with the embodiments of the present disclosure. The details of the prediction of the hotspots are shown as process 300 in FIG. 13. The generation the using, and the improvement of the model are discussed in detail in subsequent paragraphs. Throughout the description, the model is referred to as a hotspot prevention model.

After the hotspots are predicted, a recipe (referred to as a selected recipe hereinafter) that may result in the least number of hotspots is selected (process 36) based on the predicted hotspots, so that by using the selected recipe to perform the CMP, the number of hotspot is minimized, and the severity (such as the depths D1 and D2 as shown in FIG. 4) is minimized. The details of the selection of the recipe are shown as process 400 in FIG. 15. The recipe is then used for the manufacturing of the circuit on wafers, and is used to perform a CMP process (process 38) on physical wafers. It is appreciated that up to the time point the selected recipe is chosen, there may not be any CMP process performed on any wafer that implements this specific layout. After the CMP process, the resulting polished wafers may be tested (process 40) to verify the occurrence and the positions of hotspots. The test results may also be used to improve the hotspot prevention model, which improvement process is included in the process 500 shown in FIG. 18.

In subsequent paragraphs, a process flow 200 (FIG. 6) for constructing and improving a hotspot library, a process flow 300 (FIG. 13) of using the hotspot library to predict hotspots on a circuit layout, and a process flow 400 (FIG. 15) for suggesting selected recipes are discussed in detail. These processes in combination provide a solution for predicting and eliminating (or at least minimizing) hotspots without actually performing processes (such as CMP processes) on physical wafers.

Figure 6:
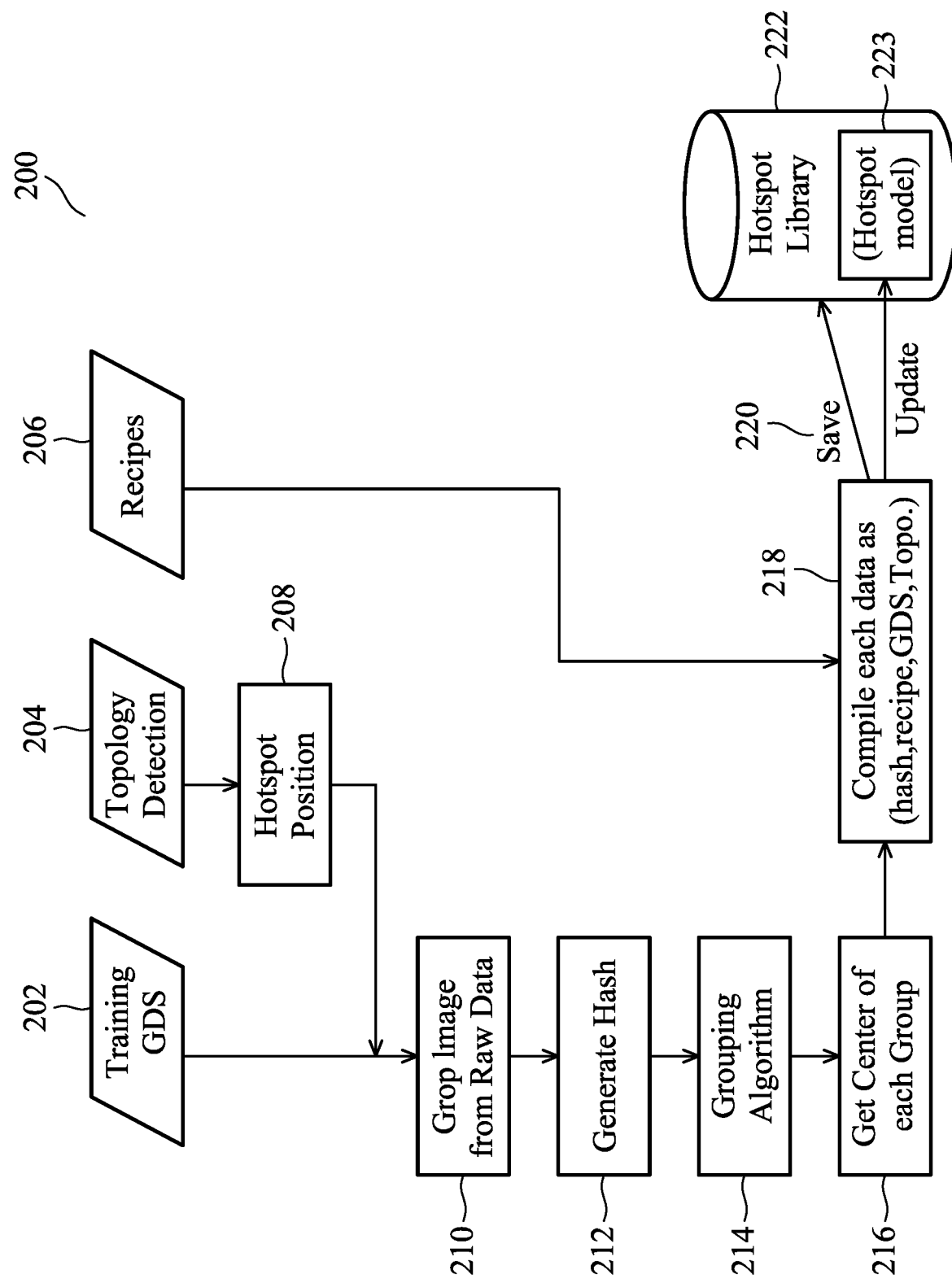
FIG. 6 illustrates a process flow for constructing a hotspot library in accordance with some embodiments.

Referring to FIG. 6, process flow 200 for generating and improving a hotspot library is provided. Referring to process 202, a training layout of a chip implementing a circuit is provided. The chip layout may be in the form of Graphic Data System (GDS) format, or any other applicable formats. Throughout the description, layouts are alternatively referred to as GDS files. It is appreciated that the training layout may be used specifically for generating the hotspot library, and is not used in the mass production of products, or may be a production layout that will be implemented on production wafers.

Figure 8:
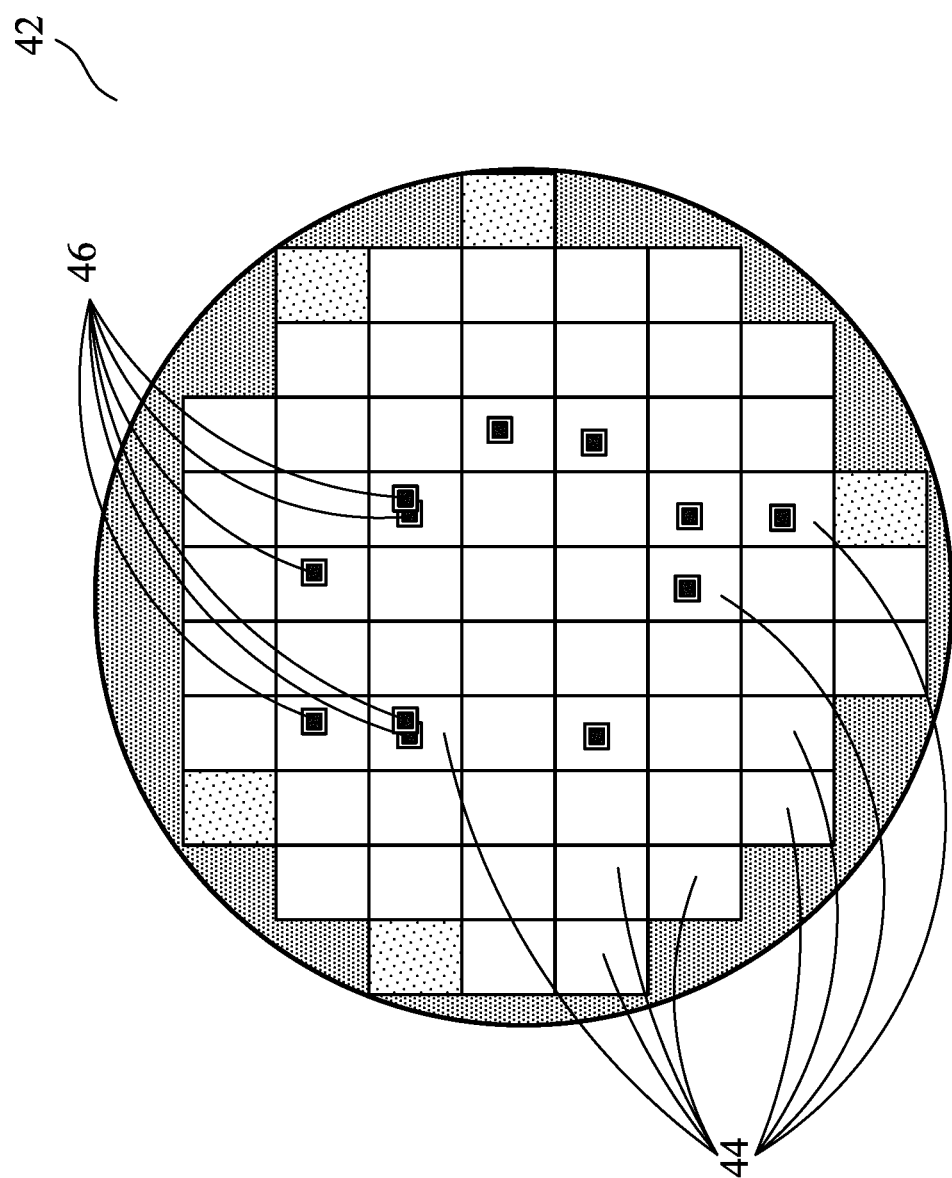
FIG. 8 illustrates a schematic view of an example wafer having hotspots in accordance with some embodiments.

An experimental wafer is then manufactured to implement the training GDS. FIG. 8 illustrates a schematic view of the corresponding wafer 42, which includes a plurality of chips 44, with the layout (the training GDS) implemented in each of chips 44. After a CMP process is performed, a test is performed to measure the surface topography of wafer 42 (process 204 in FIG. 6), and hotspots 46 in wafer 42 are identified. The positions of hotspots 46 in wafer 42 are recorded, as shown as process 208 in FIG. 6. Since there may be a plurality of hotspots 46 found in process 204, a plurality of positions in the wafer 42 are recorded.

Figure 9:
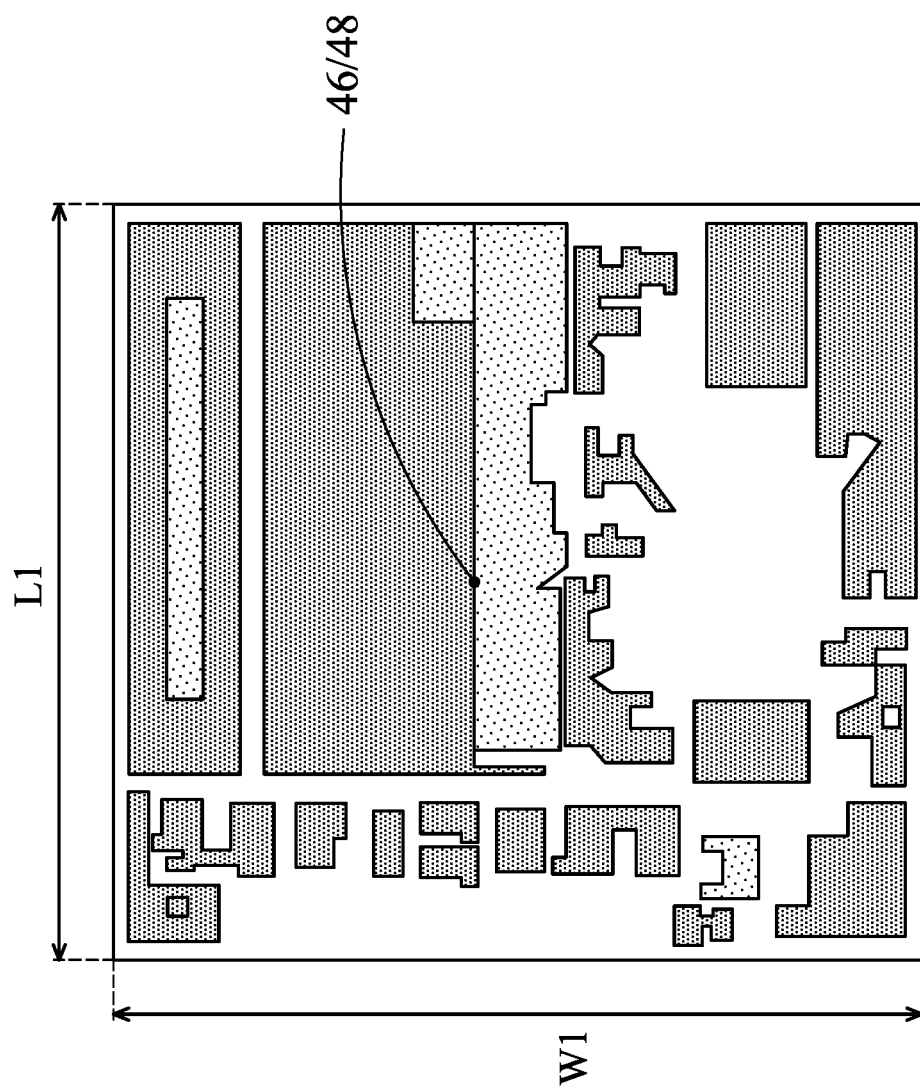
FIG. 9 illustrates an example cropped image in accordance with some embodiments.

Next, as shown as process 210 in FIG. 6, for each of the found hotspots 46, an image is cropped from the layout, which may be in the form of the row GDS file. For example, FIG. 9 illustrates an example cropped image. Assuming a hotspot 46 is found at position 48, the image surrounding hotspot 46 is cropped from the row layout data. The image may be rectangular, and may be a square. The length L1 and width W1 of the cropped image is selected so that the surrounding environment around hotspot 46 is large enough to include the surrounding features whose patterns and density may result in the hotspot 46, but not too large to include features not affecting the generation of the hotspot 46. For example, length L1 and width W1 may be in the range between about 64 μm and about 512 μm. Since there may be a single or a plurality of hotspots 46 found in the process 204, a single or a plurality of images may be cropped from the layout of wafer 42.

Referring to process 212 in FIG. 6, hash values are generated from the cropped images. FIG. 7 illustrates an example for generating hash values from images. Since images cannot be indexed and cannot be searched, an image is represented by a hash value, which is a unique digital representation of the image. The hash values and the images are one-to-one correspondent, so that identical images will generate identical hash values, and different images will generate different hash values. Furthermore, images that are similar to each other will generate similar hash values, and the similarity of hash values may be calculated. The similarity of hash values also represents the similarity of images. For example, the similarity of hash values may range between 0 and 1, with value 0 meaning the images are totally different from each other, and value 1 meaning the images are identical. The generation of the hash values from images, and the calculation of the similarity of the hash values may be performed using existing algorithms and tools. For example, Discrete Cosine Transform (DCT) algorithm used by Perceptual hash (pHash) is a known available algorithm.

The hash values may be obtained through intermediate values represented by two-dimensional matrices, which are then converted to the hash values represented by a series of digits and letters. For example, FIG. 7 illustrates three example images image A, image B, and image C. The details of the images are not shown. Image A shows a person wearing thick clothes sitting in snow, with a tree in the snow. Image B is similar to image A, except it has been equalized from Image A, with colors and contrast being adjusted. Image C shows a human face wearing a goggle on his forehead, with fire flames surrounding the face. On the right side of each of the images A, B, and C, a 8×8 two-dimensional matrix is provided, which matrix is generated from the corresponding images and/or two-dimensional matrices. The hash values, which include digits and letters, are shown on the right side of the respective matrices. Referring back to FIG. 6, when a single or a plurality of hotspots 46 are found in the process 204, a single or a plurality of images are cropped, and a single or a plurality of hash values are generated in process 212.

Figure 10:
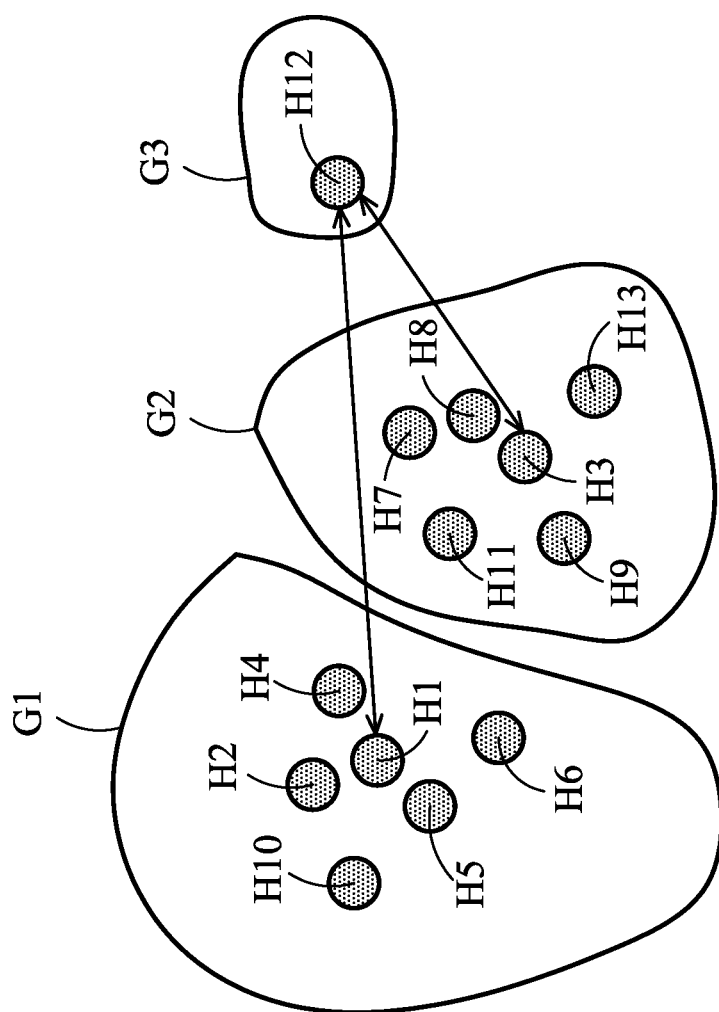
FIG. 10 illustrates the grouping of hash values in accordance with some embodiments.

Referring to process 214 in FIG. 6, the plurality of hash values are grouped into one or a plurality of groups through a grouping algorithm, wherein the grouping is according to the similarity of hash values, with similar hash values grouped in a same hash group. An example grouping algorithm is explained using FIG. 10. FIG. 10 illustrates a plurality of circles illustrated in a 2-dimensional space for visually illustrating the hash values, with each circle representing a hash value generated from a cropped image. In the grouping algorithm, a plurality of hash values, which include the illustrated hash values H1 through H13 as an example, are processed one-by-one. It is assumed the order of processing is the sequence number of the hash values (1 to 13, for example). When hash value H1 is processed, since there is no other hash value, and there is no hash group generated previously, a first hash group G1 is generated, and hash value H1 is placed into the first group G1. The first placed hash value H1 is considered as being the center of the first group G1.

Next, as second hash value H2 is processed. A similarity value is calculated between hash value H2 and the center of group G1, which center is H1. Assuming the similarity value is greater than a predetermined threshold similarity value, it is considered that the hash values H1 and H2 are similar to each other, and hash value H2 belongs to hash group G1. Throughout the description, two hash values with the similarity value greater than the predetermined threshold similarity value are referred to as similar hash values. Their corresponding images are also referred to as similar images. Hash value H2 is added into hash group G1. In accordance with some embodiments, the threshold similarity value is 0.9, while other values may be used.

Assuming the next processed hash value is H3, a similarity value is calculated between hash values H3 and the center H1 of hash group G1. Further assuming the similarity value is equal to or smaller than the predetermined threshold similarity value, it is considered that the hash values H1 and H3 are not similar, and hash value H3 does not belong to hash group G1. Accordingly, a second hash group G2 will be generated, and hash value H3 is placed into hash group G2. Hash value H3 is the center of hash group G2.

In subsequent processes, each of the remaining hash values H4 through H13 is processed one-by-one to calculate their similarity to the centers of the existing hash groups (such as G1 and G2), so that it can be determined to which hash group the newly processed hash values belong to, or whether new hash groups should be generated. FIG. 10 illustrates the example in which hash value H12 is not similar to any of the centers (such as H1 and H3), so that an additional hash group G3 is generated, and hash value H12 is placed into hash group G3. Other hash values H4-H11 and H13 are in hash groups G1 or G2.

Referring to process 216 in FIG. 6, the centers of each of the hash group is retrieved, which centers may be the hash values that are the first to be placed into each of the hash groups. After the centers of the hash groups are retrieved, the non-center hash values are discarded since each of the center is similar to, and can represent, other hash values in its group. Alternatively stated, the cropped images represented by the discarded hash values in a same hash group are similar to the cropped image represented by the center hash value of the hash group. The hash values of the center hash values in different hash groups are not similar to each other. Otherwise, if two center hash values are similar to each other, the two center hash values would have been placed in the same hash group, and as a result, only one of them would have been the center, and the other would have been discarded.

Figure 18:
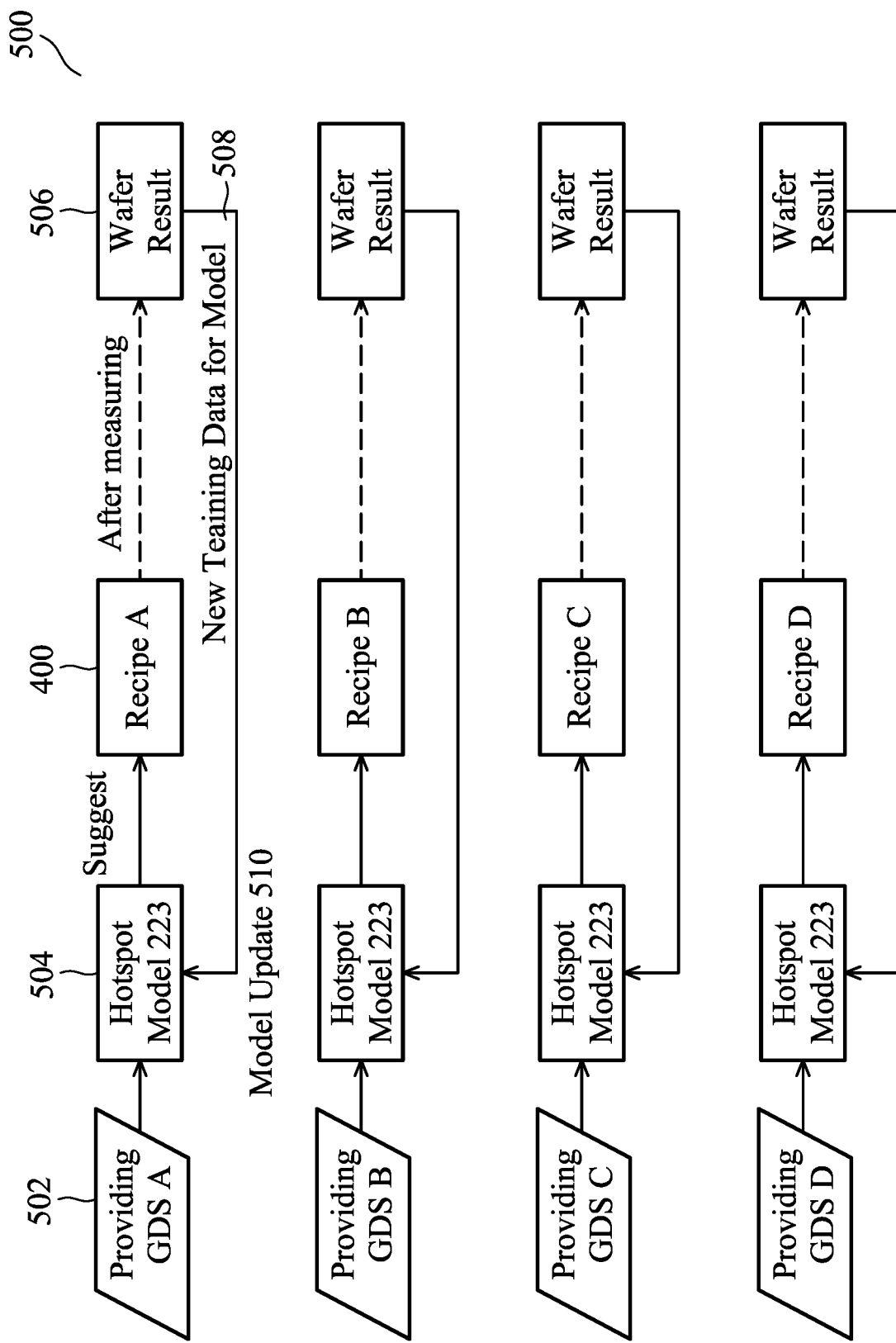
FIG. 18 illustrates a process of improving a hotspot prevention model and improving recipes in accordance with some embodiments.

Referring to FIG. 6, in process 218, a hotspot library (which includes a database) entry is composed for each of the hash values that are not discarded, which un-discarded hash values are the centers of the hash groups. In accordance with some embodiments, a plurality of recipes are generated, as shown by process 206 in FIG. 6. The generation and the improvement of the plurality of recipes are discussed referring to FIG. 18. The plurality of recipes may also include empirical recipes that are known to be able to eliminate hotspots for certain types of images. Each of the plurality of recipes corresponds to a testing GDS as shown in FIG. 18, which has its hash value. The hash values of the un-discarded centers of the hash groups are compared to (through calculation of similarity values) the hash values of the GDS files corresponding to the recipes, and the recipes whose corresponding testing GDS are closest to a center hash value is associated to the respective center hash value. Each of the center hash values will be associated with a recipe.

In addition to the recipe, the cropped image, from which the corresponding center hash value is generated, is associated with the center hash value. Also, as will be discussed in subsequent paragraphs, the expected topology information (such as whether the hotspot is under-polish or over-polish, and the recessing depth or the hump height) is also associated with the recipe (as will be discussed referring to FIG. 18). The expected topology information is also obtained in the process shown in FIG. 18. Accordingly, each of the hotspot library entry includes a hash value, the corresponding cropped image, the corresponding recipe, and the corresponding topology information. There are a plurality of hotspot library entries generated. The indices of the hotspot library entries may be hash values. These hotspot library entries are saved in a database in hotspot library 222 as shown in the process 220 in FIG. 6.

As also shown in FIG. 6, through the processes in process flow 200, a hotspot prevention model 223 may be constructed and updated. The hotspot prevention model 223 incorporates the relationship between GDS files and hotspots as previously discussed, and uses GDS files or cropped images (or its corresponding hash values) as input parameters, and outputs hotspots as output parameters.

FIGS. 11 and 12 schematically illustrate example cropped images that are saved in the hotspot library along with the hash values. It is appreciated that FIGS. 11 and 12 are schematic, with the contours of some large regions 52 being shown, while the contours of some smaller regions are not shown. Furthermore, inside each of the regions, there are a plurality of patterns such as parallel strips, and the patterns in the illustrated regions 52 are not shown. The sizes, the shapes, and the density of the patterns in the illustrated regions 52 may be different from each other. The different patterns, pattern densities, etc., which form the environment surrounding the hot spot 46, are the reasons of the hotspot. For example, in FIG. 11, region 50 has small line widths, which are much smaller than the line widths of its surrounding regions 52. Region 50 may also have a higher pattern density, which is much higher than the pattern density of its surrounding regions 52. This causes the hotspot 46. When similar images with similar environments are found in other GDS file, it is expected hotspot may occur.

FIG. 12 illustrates a cropped image saved in hotspot library. Similarly, regions 52 illustrating the contours of some large regions are shown, while the contours of some smaller regions are not shown. Furthermore, inside each of the regions 52, there are a plurality of patterns such as parallel strips, which are not shown. The sizes, the shapes, and the density of the patterns in the illustrated regions 52 may be different from each other, leading to the respective hotspot 46.

In the previous discussion, it is assumed that when process flow 200 is started, the hotspot library 222 has not been generated, and there is no hash group and center hash value generated previously. Accordingly, new hash groups will be generated and hotspot library will be generated from scratch. Once hotspot library 222 is generated, the hotspot library 222 may be improved ongoing using new training GDS files, which may be mass production GDS files or the GDS files specifically for training purpose and not for production. The processes 202, 204, 208, 210, 212, and 214 in FIG. 6 will be repeated on the new GDS files. Accordingly, a plurality of new hotspots are found from the newly manufactured wafer implementing the new GDS file, and hence a plurality of new images are cropped. A plurality of new hash values are then generated from the newly cropped images. The newly generated hash values are then processed one-by-one, and their similarity to the existing center hash values (stored in hotspot library 222) are calculated. It is appreciated that at this time, the stored center hash values are theoretically still the centers of hash groups, except that each hash group is a single-member group (with non-center members being discarded already) having only one hash value left, which is the center of the previously processed hash group. The similarity to each of the stored center hash values in hotspot library 222 is calculated to determine whether the newly processed hash value belongs to the existing hash groups or not. If it belongs to one of the existing groups, the newly processed hash value and its corresponding cropped image, recipe, topology information, etc. are discarded since the similar hotspot already exists in hotspot library 222. If the newly processed hash value is not similar to any of the stored center hash values, the newly processed hash value and its corresponding cropped image, recipe, topology information will be saved in the newly processed hash value as a new entry. Through this process, the hotspot library 222 may be improved.

Figure 13:
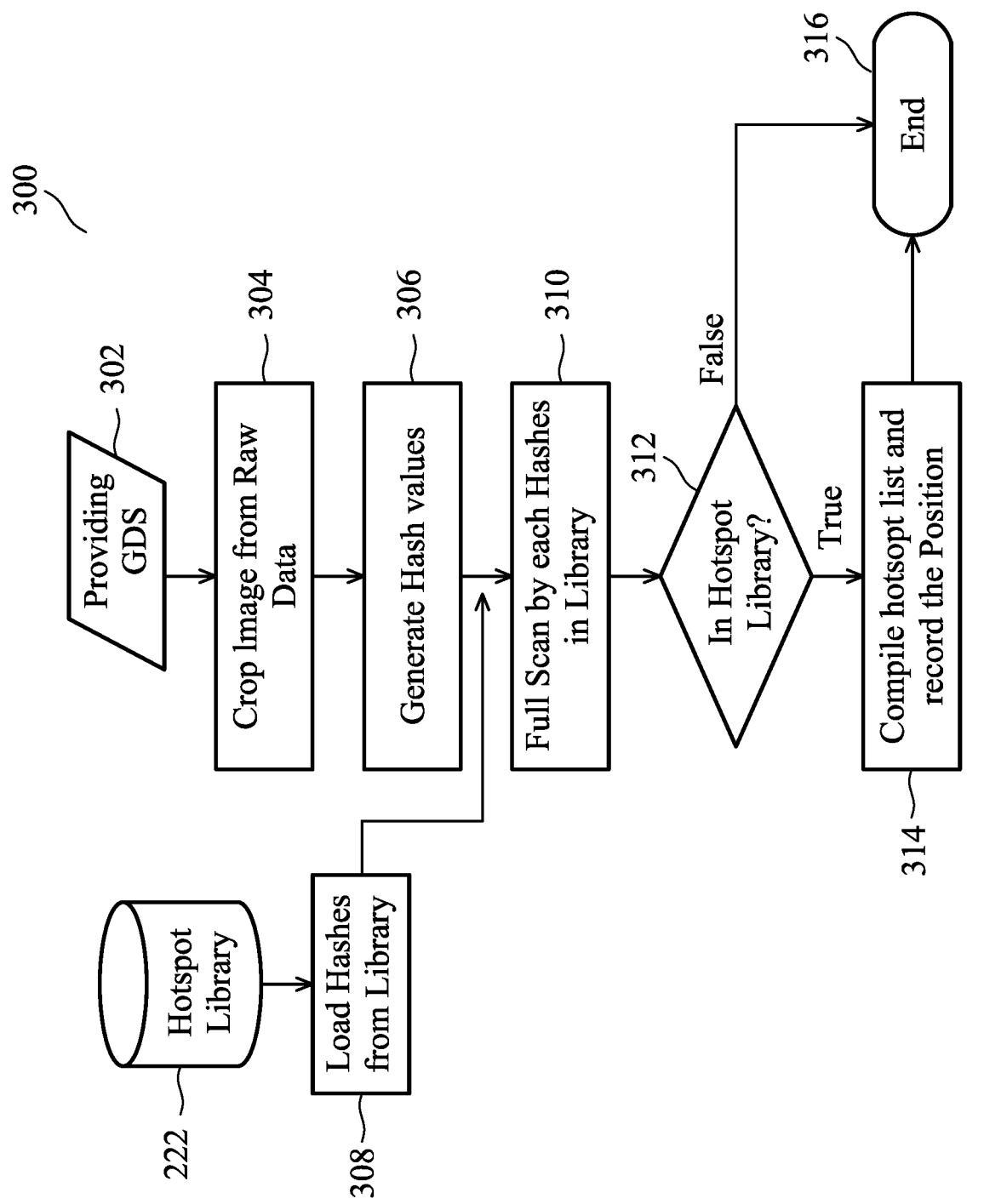
FIG. 13 illustrates a process flow of using the hotspot library to determine likely hotspots in accordance with some embodiments.
Figure 14:
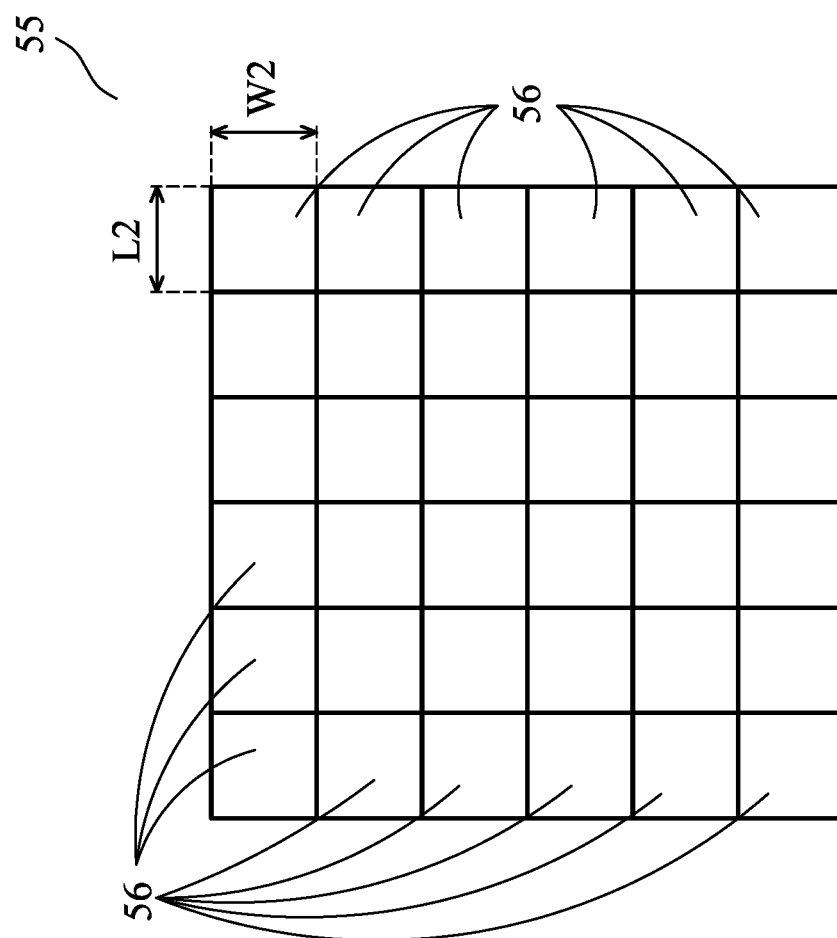
FIG. 14 illustrates the cropping of a layout into a plurality of cropped images in accordance with some embodiments.

FIG. 13 illustrates process flow 300, which is the process flow of using the hotspot library 222 to determine the likely hotspots in a new GDS file (new layout). Referring to process 302, the new GDS file (layout) is provided. Next, in process 304, the new GDS file is cropped into a plurality of cropped images, each having the sizes L2×W2 as shown in FIG. 14. For example, FIG. 14 illustrates the design of layout 55, which is divided into an array of images 56 with length L2 and width W2. In accordance with some embodiments, length L2 is equal to length L1 (FIG. 8), and width W2 is equal to width W1. In accordance with other embodiments, length L2 may be greater or smaller than length L1 (FIG. 8), and width W2 may be greater or smaller than width W1.

Referring to process 306, each of the cropped images 56 is processed to generate a hash value. The method of generating hash values is similar to what is discussed referring to process 212 in FIG. 6, and thus is not repeated herein.

Referring to process 308 in FIG. 13, the (center) hash values saved in hotspot library 222 are loaded into a computer and the respective software. Each of the newly generated hash values is compared with each of the loaded hash values from the hotspot library 222 to compare their similarity, as shown in process 310. For example, when a newly generated hash value and one of the hash values loaded from the hotspot library are similar, it is determined that the newly generated hash value and the corresponding cropped image have already been represented by its similar hash value stored in hotspot library 222 (process 312). It is also determined that hotspot(s) is likely to be generated in the respective cropped image. Accordingly, the position of the corresponding image in the respective GDS file is marked (process 314). For example, when the cropped image is in row 2 and column 3 of the array divided from layout 55 in FIG. 14, the position (2, 3) will be marked. By comparing all of the newly generated hash values (of the cropped images)

with all of the hash values in the library, a list of all of the hotspots (if any) in the GDS 54 (FIG. 14) will be generated, and the corresponding position of each of the hotspots is marked in the corresponding GDS. The marked positions may be used in the future. For example, after a CMP process, the parts of the chips at the marked positions are inspected to determine whether the hotspots have been successfully eliminated or at least reduced.

On the other hand, if none of the newly generated hash values is similar to any of the hash values loaded from the hotspot library, it is determined that the newly generated hash values and the corresponding cropped image are not represented by any of the hotspot library entry in the hotspot library 222 (process 312). Alternatively stated, no hash value is found from the GDS file, and the process may end (process 316). The layout may thus be manufactured without the concern of hotspots.

Figure 15:
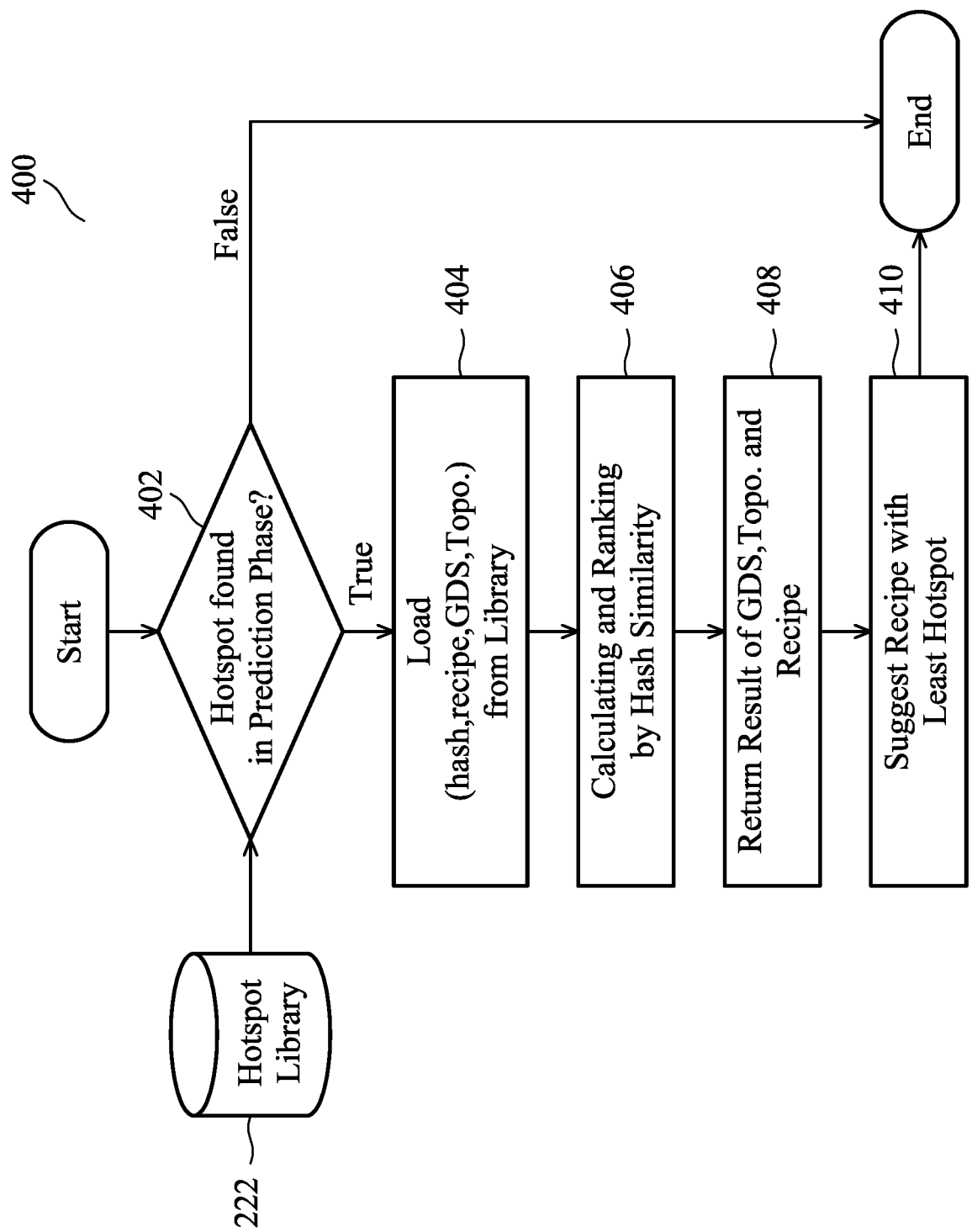
FIG. 15 illustrates a process flow for finding a recipe corresponding to hotspots in accordance with some embodiments.

FIG. 15 illustrates process flow 400 for determining and suggesting recipes, which recipes are used to perform the CMP processes in order to eliminate or at least reduce the hotspots found in process flow 300 as in FIG. 13. Referring to process 402, the list of the hotspots generated in process 314 in process flow 300 (FIG. 13) is retrieved. If there was no hotspot found, the process flow is ended. If one or more hotspot is found, a comparison is made to find the hotspots in the hotspot library 222 that are similar to the found hotspots. To perform the comparison, the hash values stored in the hotspot library 222 are first loaded into the respective tool and computer, and the similarity values between the hash values of the found hotspots and the corresponding hash values saved in the hotspot library are calculated (by calculating similarity values), as shown in process 406. Depending on the total number of the found hotspots in the GDS, there may be one or a plurality of similarity values, each corresponding to one of the found hotspots. The hotspots (their hash values) are ranked (process 406) according to their corresponding similarity values, with the hotspots having higher similarity values being higher ranked with higher priority than the hotspots having lower similarity values.

Referring to process 408 in process flow 400, the GDS files, the topology information and the respective recipes corresponding to the ranked hotspots are found from the hotspot library 222, for example, by indexing to the corresponding stored center hash values in hotspot library 222. The topology information is analyzed, and one of the found recipes is selected (process 410). In accordance with some embodiments, the selected recipe is the recipe corresponding to the highest ranked hash value. In accordance with some embodiments, considering other factors, the selected recipe is the recipe corresponding to one of hash values that is not ranked highest. The selected recipe may thus be used to perform the CMP process on the respective physical wafer.

Figure 16:
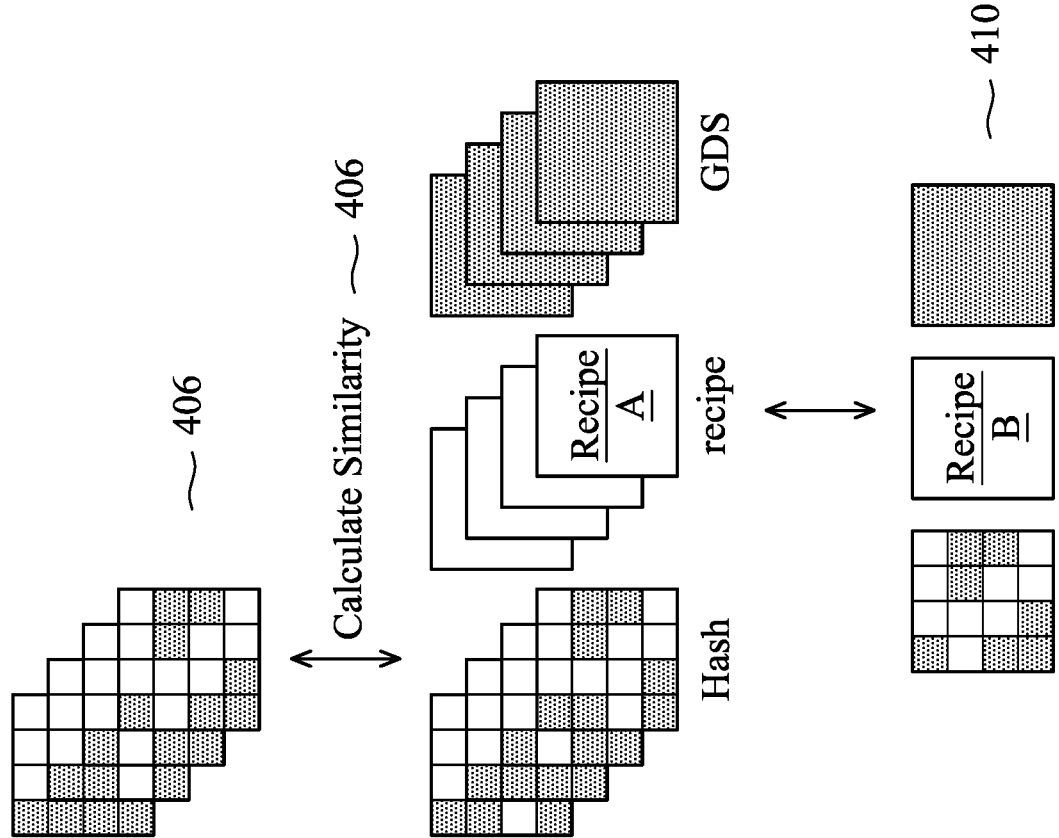
FIG. 16 illustrates a graphical representation in the finding of a recipe in accordance with some embodiments.

FIG. 16 illustrates a graphical representation of the processes 406 and 410 in the process flow 400 in FIG. 15. As is shown in FIG. 16, a plurality of hash values (represented by their two-dimensional matrices) of the found hotspots are generated, which correspond to process 404 in FIG. 15. Next, further according to process 406 in FIG. 15, the similarity values between the found hotspots and their corresponding representing hotspots in the hotspot library 222 are calculated, and the found hotspots (and their hash values) are ranked. As shown in FIG. 16, the order of the illustrated hash values is rearranged to show the ranking. FIG. 16 also illustrates a plurality of recipes and GDS files corresponding to the ranked hash values. Next, one of the recipes is selected (process 410), and the selected recipe is recipe B in this example. In other embodiments, the recipe with the highest ranking (recipe A) may be selected.

Figure 17:
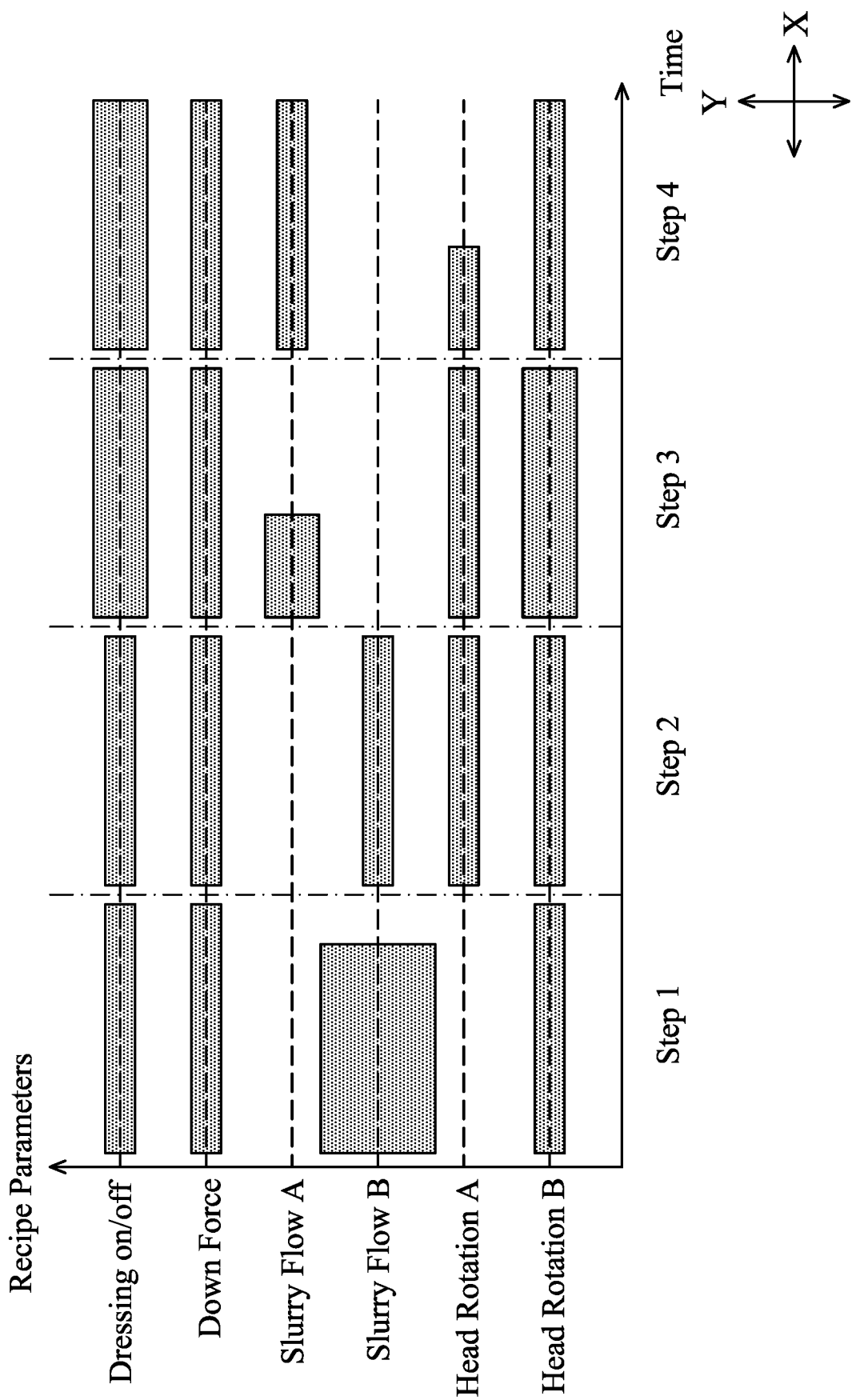
FIG. 17 illustrates an example recipe in accordance with some embodiments.

FIG. 17 illustrates an example recipe for a CMP process. Each recipe may include (sub) steps performed in the CMP process, and the parameters to be used in each of the steps. In the illustrated example, there are four steps step1, step2, step3, and step4, each being performed with a plurality of parameters, with the parameters changed from step to step. For example, there may be head rotation A, head rotation B, slurry flow A (the flow rate of a first slurry), slurry flow B (the flow rate of a second slurry), down force (of wafer head on polishing pad), dressing on/off (whether the pad conditioner is turned on or off), etc. The X-axis indicates the time of the CMP process, and the Y-axis indicates the parameters and their corresponding values. For example, for each of the values, at any time, when the corresponding bar exists, the corresponding parameter is turned on, and if the bar is wider (in the Y-direction), the corresponding parameter has a higher value. For example, slurry B has a high flow rate in the initial stage of step1, and then is turned off during the rest of the time of step1. Slurry B is a relatively small flow rate during the entire step2, and is turned off during the entire step3 and entire step4. The pad conditioner (indicated by dressing on/off) is turned on with relatively small down force during steps step1 and step2, and turned on with relatively high down force during steps step3 and step4. Throughout the description, when a recipe is referred to as being adjusted, it indicates the adjustment of the steps, parameters, and the values of the parameters in combination, which means when any of the parameters is adjusted, the recipe is considered as being adjusted.

FIG. 18 illustrates a process flow 500 for improving recipes and the process for training hotspot prevention model 223 (FIG. 6). Throughout the description, the hotspot prevention model 223 is alternatively referred to a Machine-Learning (ML) model since the model may be improved through learning in the improvement process in process flow 500. The improved recipes (recipes A, B, C, and D) may be used as the stored recipes in the process 206 in FIG. 6.

Referring to FIG. 18, a plurality of GDS (layouts) A, B, C, and D are provided. The GDS A, B, C, and D may be identical to each other, slightly different from each other, or may be totally different from each other. Each of the recipe improvement processes goes through iterations to improve the recipes. For example, a GDS A is provided (process 502), and is fed to hotspot prevention model 223 (FIG. 6), so that hotspots that likely occur are generated and output by the hotspot prevention model 223. Recipe A is then suggested, and the generation of the suggested (selected) recipe A is shown in process 400 (FIG. 15). The selected recipe A is then used to perform a CMP process on a physical wafer, in which the GDS A is implemented. A measurement is then performed on the wafer to determine the hotspots and the topology information on the wafer, and generate wafer results (process 506). In the measurement, the positions on the wafer, which positions are marked in process 314 (FIG. 13) will be inspected to determine whether the respective hotspots found in process 312 (FIG. 13) have been eliminated or at least reduced. If the hotspots are eliminated or at least reduced, it is determined that the recipe is beneficial, and may or may not be further improved. If the hotspots are not reduced or even worsened, a different recipe is needed.

Depending on the wafer results, training data 508 (which may include the measurement results) are fed back to the hotspot prevention model 223, and the hotspot prevention model 223 is updated (process 510). For example, when the measurement results indicate that some new hotspots are found, or some expected hotspots do not exist, the hotspot prevention model is updated so that the hotspot prevention model will output the newly found hotspots, and will no longer output the model that do not exist.

Furthermore, based on the measurement results, recipe A may be revised, for example, for eliminating the remaining found hotspots. Another wafer may then be manufactured and a CMP is performed using the revised recipe A, and measurement may be performed to determine the hotspot and topology information. This constructs an iteration, and the iteration may be continued until the results are satisfactory.

GDS A, B, C, D may be identical to each other, and the initial recipes A, B, C, D may be chosen to be different, so that recipes may be improved in different directions, and eventually, an optimized recipe may be selected among the revised recipes A, B, C, and D, each being revised in their own iterations. GDS A, B, C, D that are different from each other may also be used, so that the resulting models may cover different layouts, and more recipes may be generated for different layouts.

Figure 19:
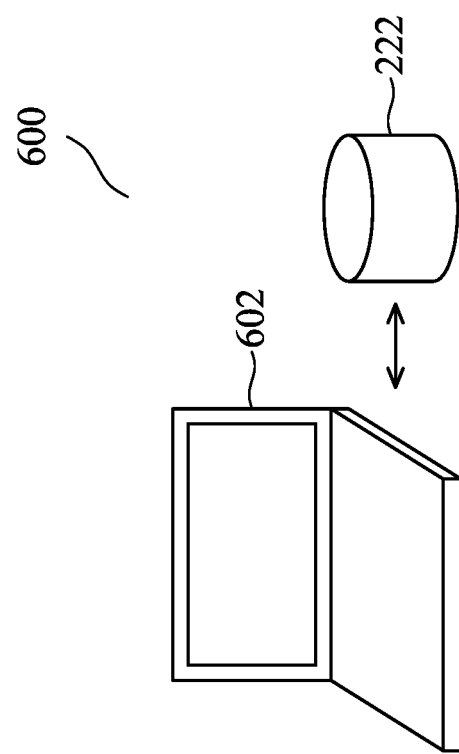
FIG. 19 illustrates a system for performing the tasks in accordance with some embodiments.

FIG. 19 schematically illustrates a tool 600 for performing the tasks as aforementioned, which include and are not limited to calculation, determination, and storing hotspot library 222. For example, the processes as shown in process flows 200, 300, 400, and 500 may all be performed using the computer (processors) 602, which includes the hardware and the software (computer program codes). The program codes of tool 600 may be embodied on a non-transitory storage media, such as a hard drive, a disc, or the like. Hotspot library 222, which may be embodied in a storage such as hard disc, is electrically and signally connected to the computer 602 for saving and retrieving.

The embodiments of the present disclosure have some advantageous features. By predicting hotspots and selecting recipes to reduce/eliminate the predicted hotspots, there is no need to manufacture physical wafer and measuring the physical wafer to find hotspots. The first physical wafer may be manufactured using the recipe that hopefully will eliminate potential hotspots. The manufacturing cycles may be reduced significantly, for example, by a third of time.

In accordance with some embodiments of the present disclosure, a method comprises cropping a plurality of images from a layout of an integrated circuit; generating a first plurality of hash values, each from one of the plurality of images; loading a second plurality of hash values stored in a hotspot library; comparing each of the first plurality of hash values with each of the second plurality of hash values, wherein the comparing comprises calculating a similarity value between the each of the first plurality of hash values and the each of the second plurality of hash values; comparing the similarity value with a pre-determined threshold similarity value; and in response to a result that the similarity value is greater than the pre-determined threshold similarity value, recording a position of a corresponding image that has the result, wherein the position is the position of the corresponding image in the layout. In an embodiment, the plurality of images form an array, and the position comprises a row number and a column number of the corresponding image in the array. In an embodiment, the method further comprises manufacturing the integrated circuit on a wafer, wherein the manufacturing comprises performing a chemical mechanical polish process on the wafer; and finding hotspots from the position, wherein the hotspots are defects in the wafer as a result of the chemical mechanical polish process. In an embodiment, the cropping the plurality of images comprises dividing the layout into an array of images, and cropping each of the plurality of images in the array. In an embodiment, the pre-determined threshold similarity value is 0.9. In an embodiment, the method further comprises cropping an additional plurality of images from an additional layout of an additional integrated circuit; generating a third plurality of hash values, each from one of the additional plurality of images; comparing each of the third plurality of hash values with all hash values stored in the hotspot library to find a group of hash values similar to the third plurality of hash values; and ranking similarity values of the group of hash values. In an embodiment, the method further comprises selecting a recipe associated with one of the group of hash values.

In accordance with some embodiments of the present disclosure, a method comprises cropping a plurality of images from a layout of an integrated circuit; generating a plurality of hash values, each from one of the plurality of images; searching from a hotspot library to find similar hash values that are similar to the plurality of hash values, wherein the hotspot library stores hash values indexed to images that have hotspots; and marking positions of some of the plurality of images that are associated with the similar hash values on the layout of the integrated circuit. In an embodiment, the method further comprises implementing the layout of the integrated circuit on a wafer, wherein the implementing comprises performing a chemical mechanical polish process on the wafer using a recipe; and inspecting the positions on the wafer to determine hotspots at the positions. In an embodiment, the method further comprises determining the recipe based on the similar hash values that have been found. In an embodiment, the similar hash values are associated with a plurality of recipes in the hotspot library, and wherein the recipe is selected from the plurality of recipes. In an embodiment, the recipe comprises a first duration and a flow rate of a slurry used in the chemical mechanical polish process, and a second duration and a magnitude of each of a dressing and a down force used in the chemical mechanical polish process. In an embodiment, each of the plurality of images has a square shape, with a length and a width of the square shape being in a range between about 64 µm and about 256 µm. In an embodiment, the hotspot library comprises a plurality of entries, each comprising a hash value, an image, a recipe, and a topology information. In an embodiment, the hotspot library is indexed by hash values.

In accordance with some embodiments of the present disclosure, a system comprises a library stored in a tangible media, the library comprising a plurality of entries, each comprising a hash value; an image associated with the hash value, wherein the image comprises a hotspot; a recipe configured to reduce the hotspot; and a topology information of the hotspot. In an embodiment, the system further comprises a tool comprising a software, wherein the software is configured to generate the hash value from the image. In an embodiment, similarity values of any pair of hash values in the plurality of entries stored in the library is smaller than about 0.9. In an embodiment, the hotspot comprises a recess or a bump occurring at a center of the image. In an embodiment, the recipe comprises process conditions that are configured to reduce the hotspot.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   determining likely hotspots of a wafer;
   comparing hash values of the likely hotspots with stored hash values in a hotspot library to determine a similarity value for each of the likely hotspots; and
   based on the similarity values determined in the comparing, selecting a polishing recipe from the hotspot library.

2. The method of claim 1 further comprising polishing the wafer using the polishing recipe.

3. The method of claim 1, wherein the polishing recipe is selected as corresponding to a highest-ranking hotspot in the likely hotspots, and wherein the highest-ranking hotspot has a highest similarity value among the similarity values.

4. The method of claim 1, wherein the polishing recipe is selected as corresponding to a non-highest-ranking hotspot in the likely hotspots, and wherein the non-highest-ranking hotspot has a lower similarity value than a highest similarity value among the similarity values.

5. The method of claim 1, wherein the determining the likely hotspots comprises:
   cropping a plurality of images from a layout of the wafer;
   generating a first plurality of hash values, each from one of the plurality of images;
   loading a second plurality of hash values stored in the hotspot library;
   comparing each of the first plurality of hash values with each of the second plurality of hash values, wherein the comparing comprises calculating an additional similarity value between the each of the first plurality of hash values and the each of the second plurality of hash values; and
   comparing the additional similarity value with a pre-determined threshold similarity value, wherein the additional similarity value higher than the pre-determined threshold similarity value correspond to a hotspot.

6. The method of claim 1, wherein the polishing recipe comprises a slurry flow value for polishing the wafer.

7. The method of claim 1, wherein the polishing recipe comprises a down force value for pressing the wafer against a corresponding polishing pad.

8. The method of claim 1, wherein the polishing recipe comprises an on/off state of a pad conditioner that is used when the wafer is polished.

9. The method of claim 1, wherein the likely hotspots comprise out-of-specification recesses.

10. The method of claim 1, wherein the likely hotspots comprise out-of-specification humps.

11. A method comprising:
    providing a list of candidate hotspots of a wafer;
    finding hotspots from a hotspot library, wherein the found hotspots correspond to some of the list of candidate hotspots;
    finding polishing recipes corresponding to the hotspots found from the hotspot library;
    selecting a polishing recipe from the found polishing recipes; and
    polishing the wafer using the polishing recipe.

12. The method of claim 11, wherein the list of candidate hotspots comprise out-of-specification recesses that are likely to occur when the wafer is polished.

13. The method of claim 11, wherein the list of candidate hotspots comprise out-of-specification humps that are likely to occur when the wafer is polished.

14. The method of claim 11, wherein the finding the hotspots from the hotspot library comprises finding stored hotspots in the hotspot library that have similar hash values to the list of candidate hotspots.

15. The method of claim 14, wherein the stored hotspots in the hotspot library are found by comparing first hash values of the list of candidate hotspots with hash values stored in the hotspot library.

16. The method of claim 11 further comprising ranking the list of candidate hotspots based on their similarity values to the stored hotspots.

17. The method of claim 16, wherein the selected polishing recipe has a highest similarity value among all of similarity values of the list of candidate hotspots.

18. A method comprising:
    providing a likely hotspots of a wafer;
    finding hotspots from a hotspot library, wherein the found hotspots correspond to the likely hotspots;
    finding polishing recipes correspond to the hotspots found from the hotspot library;
    ranking the likely hotspots;
    selecting a polishing recipe from the polishing recipes, wherein the selected polishing recipe has a highest rank that is determined by the ranking; and
    polishing the wafer using the selected polishing recipe.

19. The method of claim 18, wherein the ranking is based on similarity values of hash values of the likely hotspots to stored hash values in the hotspot library.

20. The method of claim 18 further comprising:
    after the wafer is polished, inspecting the wafer to determine status of the likely hotspots; and
    modifying the polishing recipe.

* * * * *